Figure 1:
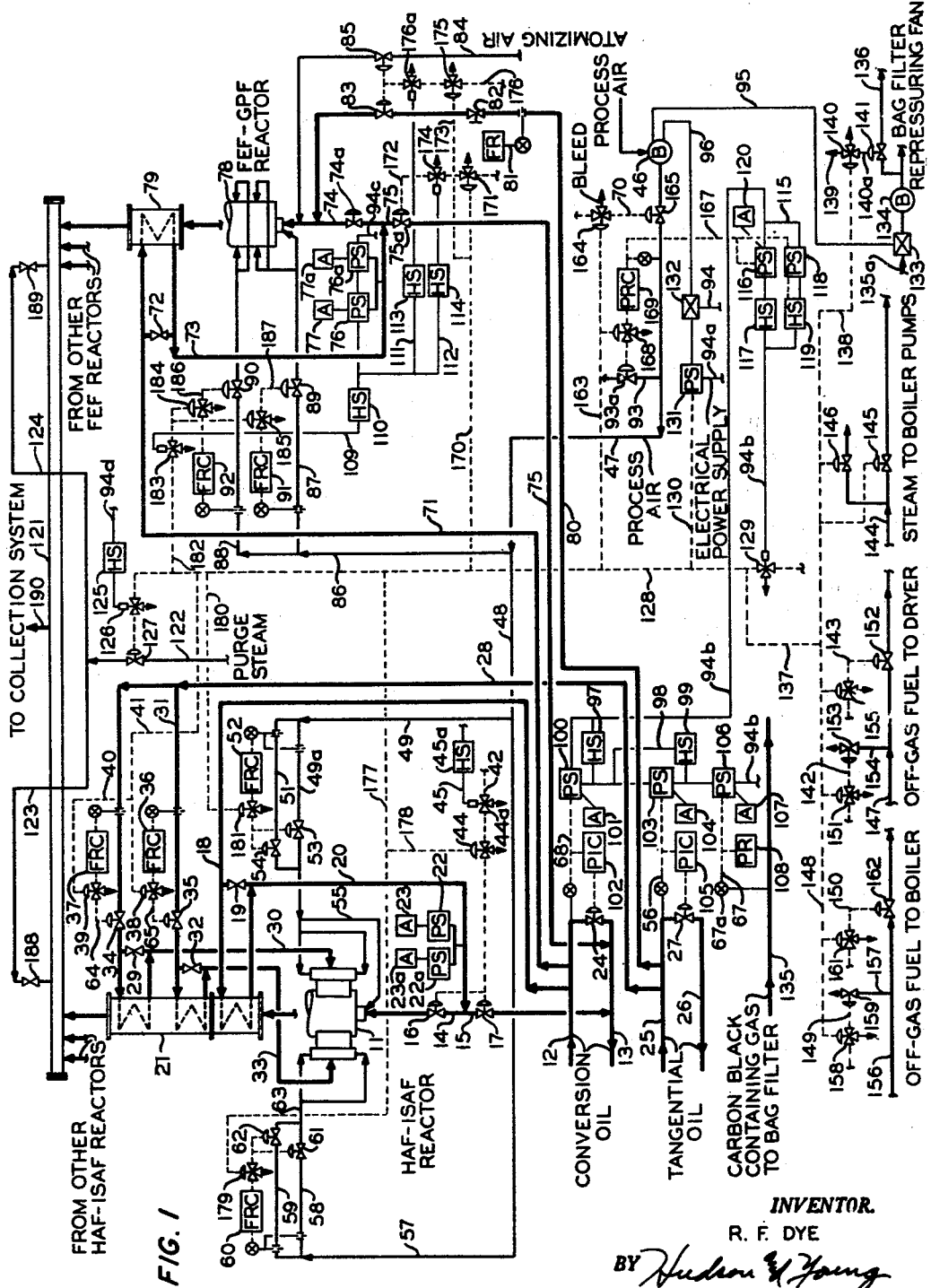

Jan. 12, 1965  R. F. DYE  3,165,522
EMERGENCY SHUTDOWN SYSTEM FOR CARBON BLACK PLANT
Filed Aug. 11, 1961  2 Sheets-Sheet 1

INVENTOR.
R. F. DYE
BY Hudson & Young
ATTORNEYS

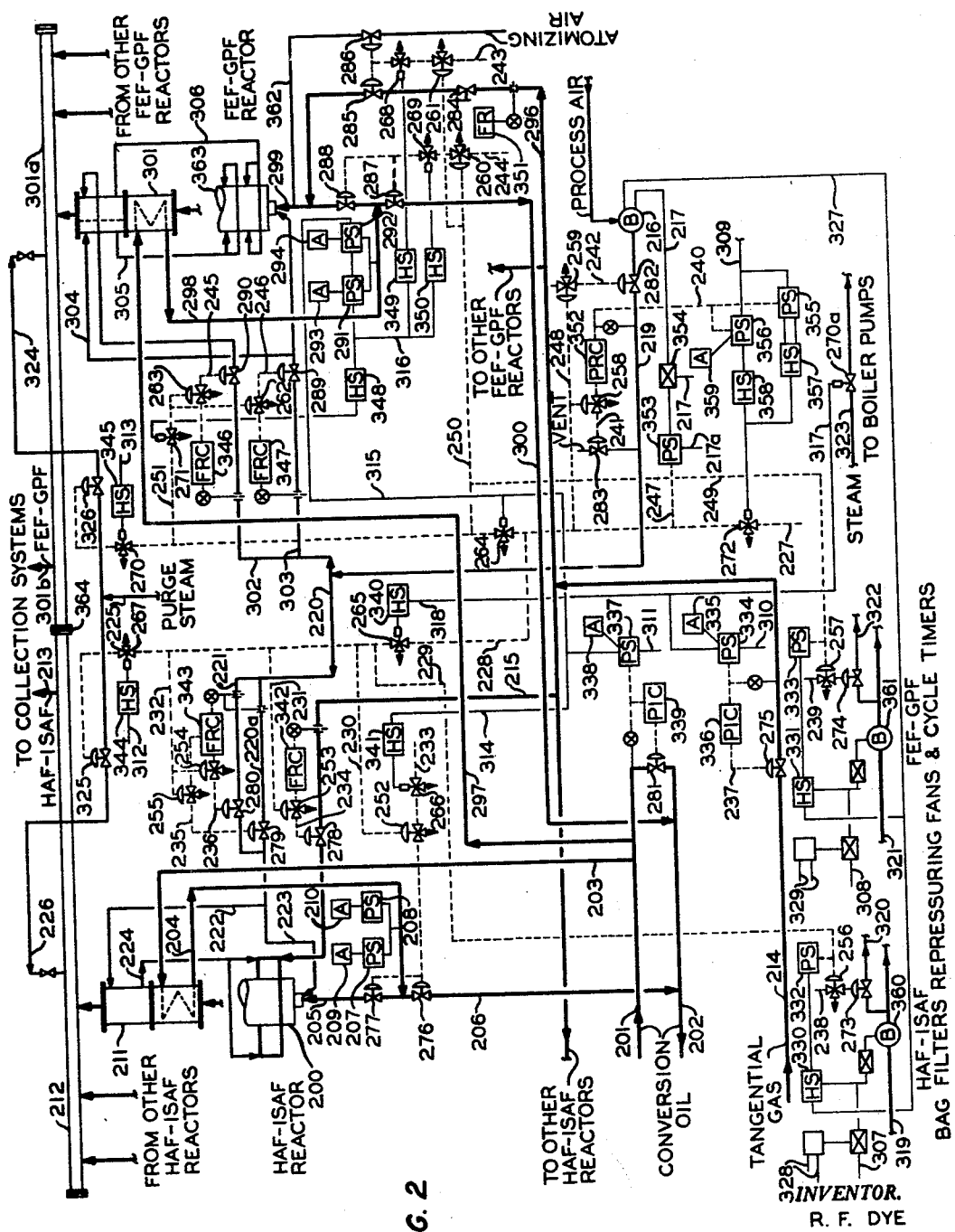

United States Patent Office

3,165,522
Patented Jan. 12, 1965

3,165,522
EMERGENCY SHUTDOWN SYSTEM FOR CARBON BLACK PLANT
Robert F. Dye, Bartlesville, Okla., assignor to Phillips Petroleum Company, a corporation of Delaware
Filed Aug. 11, 1961, Ser. No. 130,831
3 Claims. (Cl. 23—259.5)

This invention relates to a safety shutdown system for use in processes involving pyrolysis or cracking of combustible hydrocarbon mixtures. In one aspect it relates to automatic safety shutdown systems for use in carbon black manufacturing processes so that failures of electric power, process air and the like, will not give rise to explosive hazards or other undesirable conditions.

This invention is particularly applicable in a carbon black process wherein a hydrocarbon charging stock is cracked within a reactor or furnace, or a plurality thereof, in the presence of gases resulting from the partial combustion of a fuel with air. The effluent gas from the reactor contains carbon black in suspension and is conducted through a suitable header to a quench unit and subsequently to agglomerators and bag filter units for recovery of the carbon black from the suspending gas. In a conventional carbon black production process such as that disclosed in U.S. Patent 2,641,534, or Patent 2,564,700, a heavy gas oil or natural gas is preheated in a direct-fired preheater or in an indirect heat exchanger installed in the effluent or smoke pipe downstream of the carbon black reactor. The hydrocarbon charging stock is thus preheated to a predetermined temperature and it is then fed axially into the reactor along with a small stream of process air. A fuel mixture such as a mixture of natural gas, or oil and air, or air alone, is fed tangentially into the reactor so as to heat the hydrocarbon charging stock to pyrolytic or cracking temperatures.

The effluent from the carbon black reactor contains carbon black suspended in a stream of flue gases. These gases contain a substantial quantity of hydrogen, for example, about 12 volume percent or more, and carbon monoxide, also in about 12 volume percent or more, on a dry basis, as well as traces of hydrocarbons. Carbon dioxide gas is also present. Since a deficiency of air is employed as regards the feed oil and tangential fuel, all or substantially all of the oxygen is consumed in the partial combustion. However, in the event of a pressure failure within the plant production system due to axial oil or tangential fuel failure without failure of process air, this process air can enter through the smoke headers downstream of the reactors, quench unit, etc., which contain combustible gases. This air gives rise to hazardous conditions which can result in an explosion due to the presence of the hydrogen and carbon monoxide. Such a mixture can be ignited on contact with the heated surfaces of equipment. Reduced pressure in the system can develop from failure of process air, tangential fuel, axial oil, purge steam and system cooling. Under these conditions air is drawn into the system.

Furthermore, a failure in the process air supply can cause combustion gases from the reactor to back up into the air supply header with the result that a further explosive hazard may exist. Failure of process air supply can also result in severe coking in the reactor.

Also, interruption or failure of the tangential fuel supply as the result, for example, of low level in the supply tank or mechanical failure, will give rise to undesirable operating conditions, especially where the supply of process air is continued.

Failure in the supply of hydrocarbon charge stock can result in undesirable coking in the preheater tubes since the residual heat in the hot refractories of the preheater is usually sufficient to coke a substantial portion of the charging oil remaining in the tubes. In many cases the coils or tubes in which the charge stock is being preheated have been actually ruined and have required replacement with a consequent measurable increase in maintenance and replacement costs.

In carbon black production reactors employing only air tangentially, charge oil failure with continued air flow results in production of a highly explosive atmosphere in the reactor and in downstream equipment at least for a short period of time.

Manual shutdown of the various supply sources to prevent hazardous conditions from arising has often been unsatisfactory because of the inefficiencies and uncertainties of manual shutdown systems.

Furthermore, employment of manual shutdown systems has attendant difficulties in insuring proper sequence of shutdown operations, as well as proper sequence of starting up operations.

Accordingly, an object of this invention is to provide an improved automatic safety shutdown system for use in furnace carbon black processes. Another object of this invention is to provide an automatic safety shutdown system for use in carbon black processes so that failures of electric power, process air, or the like, will not give rise to explosive hazards or other undesirable conditions. Still another object of this invention is to provide an improved safety shutdown system for carbon black processes wherein coking of the hydrocarbon charging stock in the preheater tubes is prevented if a charge stock supply failure occurs. Further objects and advantages of this invention will be realized upon reading the following description which, taken with the attached drawing, forms a part of this specification.

In the drawing, FIGURE 1 illustrates, in diagrammatic form, an arrangement of apparatus parts suitable for use in safely shutting down a carbon black production system when certain process failures occur. FIGURE 2 illustrates, in diagrammatic form, another arrangement of apparatus parts suitable for carrying out the shutdown operations of a carbon black production system in case of certain process failures.

The apparatus illustrated in FIGURE 1 is directed to use in a "1-line" system. By the term "1-line" is meant the employment of a single carbon black collection system for the collection of carbon black from similar or from different types of carbon black reactors producing different types of carbon black. Such a 1-line system is so arranged that only one type of reactor producing one kind of carbon black can be operated at a time because of the single collection system. At any subsequent time when another type of carbon black is desired, either the original reactor is operated under different operating conditions or another reactor is used. In other words, only a single type of carbon black can be produced and collected at one time in the 1-line system.

In the 2-line system, illustrated in FIGURE 2, two separate carbon black collection systems are provided. In this case the two different types of carbon black reactors can be operated at the same time with each reactor passing its effluent gases containing carbon black in suspension to the respective carbon black collection systems.

In either of the 1-line or 2-line carbon black production systems more than one reactor can be used in place of the single reactor illustrated in the drawing.

In the drawing, and in reference to FIGURE 1, reference 11 identifies a carbon black producing reactor herein termed an HAF–ISAF reactor. The HAF refers to production of the high abrasion furnace carbon black and the ISAF refers to an intermediate super-abrasion furnace carbon black. A conduit 12 leads the carbon black producing charge oil from a source, not shown, to the carbon black production system. A normally open valve 24 is provided and is maintained in a closed position so that charge oil will be forced from conduit 12 to the several reactors in this figure. A conduit 13 is provided as a return conduit for the charge oil under certain abnormal or emergency conditions. In the operation of reactor 11 charge oil from conduit 12 is passed through a conduit 18 and through a heat exchange coil in a heat exchanger or preheater 21 and through conduits 20 and 14 and charged to the reactor. A diaphragm valve 16 is a normally closed valve maintained in an open position during normal plant operations. A conduit 15 is provided at the end of conduit 20 for return of the carbon black charge oil to return conduit 13 under abnormal or emergency plant conditions. A valve 17 is a normally open valve but is maintained in a closed condition during normal plant operations. Pressure switch 22 is a high pressure switch and is adapted to sound an alarm 23 in case the charge oil pressure exceeds the predetermined pressure such as 125 pounds per square inch gage. Another pressure switch 22a is provided, as illustrated, for sounding an alarm 23a in case the pressure of the charge oil drops to a pressure below a predetermined pressure, such as 75 pounds per square inch gage.

A conduit 25 is provided for passage of tangential fuel, that is oil or gas as the case may be, from a source, not shown, to the system illustrated in FIGURE 1. From conduit 25 oil is passed through a conduit 28 with a portion passing through a conduit 31 to separate heat exchange coils in the heat exchanger 21. From these separate coils the two portions of tangential oil pass by way of conduits 30 and 33 to separate tangential inlets or burners in the reactor.

A valve 19 is provided between the charge oil line 18 and the charge oil line 20 in case all or a portion of the charge oil to be introduced into the furnace can by-pass the heat exchanger. Similarly, valves 29 and 32 are provided in by-pass fuel conduits between conduits 28 and 30, and 31 and 33, respectively, in case all or a portion of the separate streams of tangential fuel are desired to be by-passed from the heat exchanger.

Process air is provided for supporting combustion of the tangentially added fuel. Such process air is provided under pressure by a process air blower 46 which, in the case illustrated in FIGURE 1, is an electric motor driven air blower. The effluent air from blower 46 passes through a conduit 47 with a portion of the air passing through a conduit 48 with portions thereof passing through conduits 49 and 57. The portion passing through conduit 49 is passed through conduit 51 only (a small volume) for warm up of the reactor. When this equipment is sufficiently heated for operation, conduit 51 is closed and conduit 49a opened for large volume air flow in normal plant operation. Likewise, conduit 59 is used for small volume air flow during warm up only and conduit 58 is used for large volume air flow for normal plant operation. Air passes through conduit 55, as axial air, only during production of carbon black.

Reference numeral 78 identifies an FEF-GPF carbon black reactor. The term FEF refers to fast extrusion furnace type carbon black while the term GPF refers to a furnace for production of a general purpose type carbon black. A conduit 71 is connected with the charge oil conduit 12 and leads the charge oil for use in reactor 78 to a coil in heat exchanger 79. The outlet of the coil in the exchanger is connected with a conduit 73 through which the heated oil flows for charging through a charge conduit 74 or for by-passing the reactor by flowing through a return conduit 75. Under this latter condition the return or recycled oil enters the conversion oil return conduit 13. A valve 72 is provided for by-passing all or a portion or none of the charge oil around the preheater. For passing the charge oil through conduit 74 into the reactor a normally closed diaphragm valve 74a is maintained open. Under abnormal or emergency conditions when it is desired to by-pass the reactor with the charge oil the valve 74a is closed and a normally open valve 75a, which is maintained closed in normal operating conditions, is opened for the by-passing operation.

A low pressure, pressure switch 76 is provided for sounding an alarm 77 in case the pressure of the charge oil in conduit 73 is reduced to a pressure below a predetermined pressure such as 75 pounds per square inch gage. A high pressure, pressure switch 76a is provided for sounding an alarm 77a in case the pressure of the charge oil in conduit 73 exceeds a predetermined pressure, such as 125 pounds per square inch gage. A source of electrical current 94c is provided for operation of electrical alarms 77 and 77a by way of the pressure switches 76 and 76a, respectively.

Oil for use in heating up reactor 78, when it is desired to place the cold reactor in operation, is passed from the tangential oil fuel line 25 through a conduit 80, through a manually operable valve 82 and through a pneumatically operable valve 83 into the oil charge line 74. In this reactor heating operation a paraffinic oil is used because it can be burned completely without any carbon laydown. This tangential fuel oil is added through conduits 80 and 74 during the warming up operation. A flow recorder 81 is employed in order to record, for permanent record purposes, the rate of flow of oil used during the warm-up. The manually operable valve 82 is provided in conduit 80 for permanently closing off the flow of the warm-up oil after the warm-up operations. A conduit 84 provides a supply of atomizing air for atomizing the carbon black feed oil.

Process air for the normal operation of reactor 78 is taken from conduit 47 through a branch conduit 86, with portions passing through conduits 87 and 88. A rate of flow controller 91 regulates the rate of flow through a diaphragm valve 89 for passage of a predetermined flow of air through conduit 87, a portion of which is introduced tangentially into the reactor and a portion being introduced parallel with the charge oil for cooling the charge oil injection nozzle. The portion of the process air passing through conduit 88 is regulated by operation of diaphragm valve 90 in response to the setting of the flow rate controller apparatus 92. Air passing through conduit 88 is also introduced tangentially into reactor 78. In this type of reactor, that is, the FEF and GPF, fuel is not introduced tangentially into the reactor for burning with the tangentially added air. In this case a portion of the conversion oil charge stock is burned by the tangentially added air for providing heat for carrying out the carbon forming reactions.

In this 1-line system the carbon containing gaseous effluent from reactor 11 passes through heat exchanger 21 and thence to a smoke header 121 while reactor 78 is not in operation. When reactor 78 is in operation, furnace effluent containing carbon black therefrom is passed through the heat exchanger 79 and into the smoke header 121. In this manner only a single type of carbon black is introduced into header 121 at a time and such furnace effluent containing carbon black is passed on through a conduit 190 to the collection system which, in many cases, includes cyclone separators, bag filters and the like.

The safety emergency shutdown system of this invention includes a conduit 128 leading from the source of constant pressure compressed air. This air, sometimes called instrument air or shutdown air, passes through a three-way solenoid valve 129. The following conditions close this solenoid valve from the source of air and open a bleed to reduce the pressure in conduit 128 downstream of the solenoid valve. An electrical circuit 94b supplies electrical power from a source, not shown, through several switches and relays and thence to the solenoid valve 129. Beginning at the end of circuit 94b remote from the solenoid valve 129 the circuit passes through a pressure-switch 106. Carbon black containing gases pass from conduits 121, 190, on through secondary quench towers, an agglomerator and then through a conduit 135 to a bag filter unit during normal operations. Pressure-switch 106 is set to break the circuit 94b when gas pressure in conduit 135 exceeds a predetermined pressure. This pressure is communicated to a transducer 67a which regulates instrument air pressure in a conduit 67 which, in turn, transmits the pressure signal to the pressure-switch 106. Thus, when the pressure in conduit 135 exceeds a value of, for example, 12 inches of water, pressure-switch 106 breaks the circuit 94b. A pressure recorder 108 records pressure in conduit 67 while an alarm 107 rings a bell or lights a light to attract the attention of an operation when the pressure-switch opens the circuit 94b.

As mentioned hereinbefore, tangential fuel oil is transmitted to system through conduit 25 and is thus passed through branch conduit 28 for normal operation of reactor 11 and through branch conduit 80 to the FEF reactor for warm-up purposes only. A normally closed, pneumatically operable valve 27 is a throttle valve and is operated as a back pressure valve for maintaining a predetermined back pressure in conduit 25. In case of a marked drop in fuel oil pressure as occasioned by such conditions as breakage of pipe, failure of the tangential fuel oil pump, or other reasons, pressure in conduit 25 decreases below a normal operating pressure. A pressure-switch 103 senses the pressure in fuel oil conduit 25 by way of an instrument air conduit 56 and as long as the pressure is maintained at a normal operating pressure in conduit 25, such as 100 pounds per square inch gage, the switch of the pressure-switch is maintained closed, completing the circuit 94b. However, upon a decrease in the fuel oil pressure below a predetermined pressure, pressure-switch 103 breaks the circuit 94b thereby closing solenoid valve 129 to the source of instrument air. A hand-switch 99 in a by-pass circuit 98 around the pressure-switch 103 is normally maintained open and this hand-switch is closed, if desired, to permit operation of the FEF or GPF system (excepting FEF or GPF reactor warm-up and holding) while the difficulty causing the drop in the fuel oil pressure is being corrected. After the difficulty is corrected and oil pressure in conduit 25 reaches its normal operating pressure, the pressure-switch 103 closes and hand-switch 99 is opened. A pressure indicating controller 105 is provided, as illustrated, to operate a motor valve 27 for pressure maintenance in conduit 25. When valve 27 is open, tangential oil flows through conduit 25, valve 27 and the portion not used by the reactors returns to its storage through a conduit 26. An alarm 104 can be a bell or an electric light to warn an operator when pressure switch 103 opens circuit 94b.

Conversion oil for the production of carbon black in either of the reactors originates from a source, not shown, and is passed through conduit 12, a normally closed back pressure pneumatic valve 24 and is returned to its source through conduit 13. During normal operations valve 24 is maintained open for pressure maintenance in conduit 12 by a pressure indicating controller 102. This controller is actuated by instrument air from a conduit 68, the pressure in which is regulated by or is proportional to the conversion oil pressure in conduit 12.

If, for some reason, conversion oil pressure in conduit 12 decreases below a normal operating pressure, a pressure-switch 100 opens the circuit 94b thus closing three-way valve 129 to the source of emergency shutdown air. A hand-switch 97 is provided in a by-pass circuit around pressure-switch 100. During normal reactor operation pneumatic valve 24 is maintained closed by the pressure indicating controller 102 for pressure maintenance in conduit 12 but during an abnormal drop in conversion oil pressure valve 24 is opened by bleeding off of instrument air pressure by controller 102. An alarm 101 can be a bell or a light to warn an operator of an open circuit caused by opening a pressure-switch 100.

The emergency shutdown three-way valve 129 also controls the process air blowers 46. These blowers, which can be one or more blowers, pump process air through conduit 47 and thence to various process points of the apparatus in FIGURE 1. Upon a drop in shutdown air pressure in conduit 128 downstream from the three-way valve 129, this pressure drop is sensed in conduit 130 and in conduit 163. The pressure drop in conduit 130 actuates a pressure switch 131 in circuit 94a thereby opening power switch 132 in power circuit 94–96. Blower 46 is thus closed down. With the pressure drop in conduit 163, valve 164 opens to bleed pressure from conduit 70 thereby allowing valve 165 to close. Also, three-way valve 168 opens to bleed and normally open valve 93a opens to vent process air from conduit 47 through vent conduit 93. When process air pressure in conduit 47 drops to below 2 pounds per square inch gage, pressure switch 116 opens while it remains closed above this pressure. At pressure below 3 pounds in conduit 47, pressure switch 116 is closed while it opens at a pressure greater than 3 pounds. The pressure switch 118 is in a by-pass circuit 115 around pressure switch 116 and a hand-switch 117. This by-pass circuit also contains a hand-switch 119. The hand-switch 119 is a push button switch for starting up the operation. The pressure-switch 118 is closed when process air in conduit 47 is at a pressure from 0 to 3 p.s.i.g. and opens when the process air pressure exceeds 3 p.s.i.g. and thus de-energizes the hand-switch holding coil.

As mentioned hereinbefore, pressure-switch 106 opens the circuit 94b when the pressure of the carbon black containing gas passing through conduit 135 to the bag filters exceeds 12 inches of water. Pressure switch 103 opens the circuit when the tangential oil pressure decreases to a value below normal; pressure-switch 100 opens the circuit when the conversion oil pressure decreases to a value below a predetermined value and the pressure-switch 116 remains normally closed but opens when the process air pressure decreases to a pressure of about 2 p.s.i.g. while pressure-switch 118 is closed when process air pressure is from 0 to 3 p.s.i.g. and opens when the process air pressure exceeds 3 p.s.i.g. Hand-switch 117, upon being opened, shuts down the system and when pressure switch 116 senses 2 pounds or less pressure in conduit 47, it opens and remains open and shuts down the system. Hand-switch 119 is a push button switch for starting up the operation. When starting up the operation, pressure switch 118 is closed until the process air pressure reaches 3 pounds and at this pressure, pressure switch 118 opens but pressure switch 116 had closed at 2 pounds process air pressure. Thus, switch 116 closes the circuit 94b for normal operation.

When any of these aforementioned conditions occurs to open the electrical circuit 94b, the following operational or shutdown steps occur. The solenoid of valve 129 becomes de-energized and this valve closes off the source of shutdown air and allows the bleed to reduce the pressure in conduit 128 downstream of valve 129 and the branch conduits therefrom. Upon the reduction of pressure in conduit 128 downstream of valve 129, pressure in conduit 137 decreases thereby actuating three-way valve 161 to bleed instrument air pressure from conduit 150 thus closing normally closed valve 162. At the same time reduced air pressure in conduit 148 actuates three-way valve 158 to bleed air pressure from instrument air conduit 149 thus opening normally open valve 159 and allowing the off-gas normally passing through conduit 156 to vent through vent conduit 157. This vent conduit 157 is usually connected with the boiler stack, not shown.

At the same time, a reduction of air pressure in branch conduit 148 actuates three-way valve 155 to bleed instrument air pressure from conduit 143 thereby allowing normally closed valve 152 to close. At the same time the three-way valve 151 is actuated to bleed air pressure from conduit 142 thereby allowing normally open valve 153 to open thereby venting off-gas normally passing through conduit 147 through conduit 154 to the pellet dryer stack, not shown. An extension of branch conduit 148 is identified in the drawing by reference numeral 138 and this extension leads to other operating equipment. Thus, as the instrument air pressure in branch conduit 137 decreases, pressure in branch conduit 138 also decreases, thereby opening normally open valves 145 and 146 to allow steam from conduit 144 to pass to boiler pumps, not shown. Also, a reduction of pressure in extension conduit 138 actuates the three-way valve 140 thereby bleeding instrument air from conduit 140a which, in turn, allows normally open valve 141 to open, thereby venting the off-gas passing through bag filter repressuring blower 134 through conduit 136. When this vent valve in by-pass vent conduit 136 is closed, the off-gas from conduit 135a passes on through the blower 134 to the bag filter repressuring operation.

Element 133 is an electrical interlock and this interlock prevents operation of the bag filter repressuring fan, or blower, 134 when the process air blower or blowers 46 are shut down. In other words, when pressure-switch 131, which is responsive to pressure in branch conduit 130, operates to break circuit 94a, switch 132 opens the power circuit source 94 thereby opening circuit 96 to the process air blower 46. Thus, with this latter circuit open, the process air blower is closed down and the above-mentioned interlock by way of circuit 95 opens switch 133 thereby opening the power circuit to the bag filter repressuring fan 134.

When instrument air pressure in conduit 128 decreases, pressure in branch conduit 163 also decreases thereby actuating three-way valve 164 to bleed air pressure from conduit 70 thereby closing the normally closed valve 165.

Also, this decreased air pressure in conduit 163 actuates the three-way valve 168 to bleed air pressure from the normally open pneumatic valve 93a and thereby opening conduit 47 to vent.

A drop of pressure in conduit 128 also drops pressure in branch shutdown conduit 177 thereby reducing pressure in branch conduit 178 and actuating three-way valve 44 to vent pressure from the diaphragm of normally closed valve 16 allowing this valve to close and from the normally open valve 17 thereby allowing this latter valve to open. In this manner conversion charge oil flowing through conduit 20 is by-passed from reactor 11 and returned to recycle line or conduit 13. Three-way valve 44a is provided for operating pneumatic valves 16 and 17. Thus, instrument air passing through conduit 42 and through three-way valve 44, in its normal operating position maintains valve 17 closed and valve 16 open. If at any time it is desired to close off conversion oil from reactor 11, hand-switch 45a is opened thereby opening circuit 45 and de-energizing the solenoid of valve 44a thereby venting instrument air pressure from the diaphragms 16 and 17 which venting in turn closes valve 16 and opens valve 17.

The aforementioned reduction of pressure in branch conduit 177 actuates the three-way valve 179 to bleed pressure from the normally closed valves 61 and 62 thereby permitting these valves to close thereby closing off flow of process air through conduits 58 and 59. Valving, not shown, is provided in the instrument air conduits leading from valves 61 and 62 and in the differential pressure conduits leading from conduits 58 and 59 for communication with flow controller 60 so that branch conduit 59 passes process air to reactor 11 during the warm-up period of the reactor prior to normal operation and branch conduit 58 passes air to the reactor 11 during normal operation.

Pressure reduction in conduit 128 also causes pressure reduction in branch conduit 180. Pressure reduction in conduit 180 actuates a three-way valve 181 to close normally closed valves 53 and 54. A flow recorder-controller 52 is set to control either the flow of air through 53 or through valve 54 depending upon whether the reactor is being warmed up prior to operation or if the reactor is being operated for the production of carbon black.

The pressure reduction in conduit 128 also reduces pressure in branch conduit 41 and branch conduit 40 thereby actuating three-way valves 38 and 39 to regulate or close off the flow of tangential fuel to valves 35 and 34. Flow recorder-controllers 36 and 37 regulate the rates of flow of the tangential oil through the respective heating coils in exchanger 21, one flow being added to one side of the reactor 11 and the other stream of oil being added to the other side of the reactor.

Pressure reduction in conduit 128 reduces pressure in pneumatic normally open valve 127 thereby opening this valve to allow steam from conduit 122 to pass through either conduit 123 or conduit 124 depending upon whether reactor 11 or 78 is in operation. If reactor 11 is in operation, a manually operable valve 188 is maintained open while a manually operable valve 189 is maintained closed. With valve 188 maintained open then upon opening of valve 127 steam passes from conduit 122 through conduit 123 and valve 188 to purge the portion of the smoke header 121 which is passing the furnace effluent from reactor or reactors 11. In like manner, in case reactor or reactors 78 are in operation with reactor or reactors 11 being closed down, valve 188 is closed and valve 189 is opened. Then, upon passage of steam from conduit 122 through conduit 124 the reactor 78 portion of the smoke header is purged. A hand-switch 125 in electrical circuit 94d is provided for actuation of solenoid valve 126 in case it is ever desired to purge the smoke header while pressure in conduit 128 is at its normal operating value. In this case upon de-energizing the solenoid valve 126 air pressure is bled through the three-way valve from pneumatic valve 127 thereby opening this valve for the passage of steam.

A reduction of shutdown air pressure in conduit 128 reduces air pressure in branch conduit 182 thereby actuating three-way pneumatic valves 184 and 185 to bleed pressures from conduits 186 and 187 thereby closing valves 90 and 89 respectively. A hand-switch 110 in electrical circuit 109 is provided for manually de-energizing or energizing the solenoid of the solenoid valve 183. Thus, when it is desired not to use reactor or reactors 78 while using reactor or reactors 11, the hand-switch 110 is opened thereby actuating solenoid valve 183 to close the process air valves 89 and 90. In like manner, a hand-switch 113 is provided in the branch circuit 111 to actuate a three-way solenoid valve 176a thereby bleeding instrument air pressure from normally closed valves 83 and 85 thereby closing these valves. Upon closing valve 83 the warm-up oil is closed off and also the atomizing air flow is closed off. Instrument air from a source, not shown, reaches valves 83 and 85 by way of a conduit 176.

A branch circuit 112 is provided with a hand-switch 114 for opening and closing electrical circuit to the solenoid of a three-way solenoid valve 174. This solenoid valve 174 allows instrument air pressure to be maintained in a conduit 172 which branches and leads to diaphragm valves 74a and 75a. Valve 74a is a normally closed valve and valve 75a is a normally open valve and upon actuation of three-way valve 174 to bleed, air pressure from conduit 172 causes valve 74a to close and valve 75a to open thereby permitting recycle and return of conversion oil by way of conduit 75 to the recycle conduit 13.

A reduction in the shutdown air pressure in conduit 128 furthermore reduces the air pressure in conduit 170 thereby actuating a three-way pneumatic valve 171 to vent instrument air pressure from conduit 172 and closing valve 74a and opening valve 75a to the above-mentioned recycle. A reduction of pressure in conduit 170 also reduces pressure in branch conduit 173 which reduction actuates a three-way pneumatic valve 175 to bleed instrument air pressure from the pneumatic valves 83 and 85 thereby closing these valves.

Also pressure is reduced in branch conduit 163 for actuating a three-way pneumatic valve 164 which bleeds pressure from instrument air conduit 70 thereby closing the normally closed valve 165.

In summary for the shutdown operation illustrated in FIGURE 1, upon failure of the electrical supply, upon increase in the off-gas pressure to the bag filter above the predetermined pressure, upon failure of the tangential oil supply pressure and upon failure of conversion oil pressure solenoid valve 129 operates to close off the source of shutdown air pressure and to bleed off air pressure downstream of this valve. This pressure reduction closes off the off-gas to the boiler, closes off the off-gas to the pellet dryers, opens the steam lines to the boiler pumps and closes down the bag filter repressuring fans. In case reactor 11 is in operation the pressure drop closes down conversion oil to this reactor while recycling this oil, closes off the flow of tangential oil and also closes off the process air. In case reactor or reactors 78 are in operation the reduction of air pressure in conduit 128 closes off conversion oil to these reactors and opens same to recycle while closing off process air to the reactors. Also purge stream is admitted to whichever section of the smoke header is in use.

On reference to FIGURE 2 of the drawing, reference numerals 201 and 202 identify the conversion oil feed line and the return line respectively. This feed oil passes from conduit 201 through branch conduit 203 to a heat exchanger 211 and thence through a conduit 204 to conduit 205 to an HAF–ISAF reactor 200 when a pneumatic normally closed valve 277 is open or through conduit 206 when a pneumatic normally open valve 276 is open. Pressure-switches 207 and 208 along with alarms 209 and 210 operate in the same manner as explained hereinabove in reference to FIGURE 1. A conduit 212 is provided for collecting effluent gases containing carbon black in suspension from one or more reactors 200 and for delivering the production effluent to a conduit 213 for passage to the HAF–ISAF carbon black collection system.

A conduit 214 conducts tangential gas from a source, not shown, with branch conduit 215 leading to reactor 200 and branch conduit 296 leading to one or more FEF–GPF reactors 363. A process air blower 216, which is electric motor driven, passes air through a conduit 219 with branches 220 and 302 leading to the respective reactors. Branch line 220 is provided with a by-pass of branch line 221. Conduit 302 conducts process air to a heat exchanger 301 and thence through a conduit 306 to one set of air inlets. A branch 303 conducts air for axial introduction into the reactor 363 while a branch line 304 therefrom passes another portion of the process air to heat exchanger 301 and thence through a conduit 305 to another set of air inlets. Reactor 363 (FEF–GPF) is not provided with tangential burners since only air is injected tangentially into this reactor.

The carbon black producing apparatus of FIGURE 2 is a "2-line" system, that is the reactor or reactors 200 and the reactor or reactors 363 can be operated to produce their respective types of carbon black at the same time. As illustrated in this figure, a smoke header 212 and a smoke header 301a are separated by a blind flange 364 or, if desired, these separate headers can be completely separated conduits. While header 212 passes its product by way of conduit 213 to its carbon black collection system, header 301a passes its content by way of the conduit 301b to its particular carbon black collection system.

Upon electric power failure, as, for example, by failure of the source of electric power to which circuit 309 is connected the solenoid of the three-way solenoid valve 272 is de-energized and closes off the source of shutdown air from conduit 227 and opening conduit 227 downstream of the valve 272 to bleed, thereby reducing the pressure in this downstream section of the conduit. This pressure reduction reduces pressure in the branch conduit 247 thereby causing pressure switch 353 to open electrical circuit 217a which, in turn, opens a switch 354 in power circuit 217 thereby closing down a process air blower 216. With circuit 217 open and process air blower 216 shut down, an electrical interlock operates by way of circuit 327 and closes hand-switch 330 to close down a bag filter repressuring fan 360 and also to close down by way of hand-switch 331 a bag filter repressuring fan 361. Bag filter repressuring fan 360 normally operates to repressure the bag filters separating carbon black from reactor 200 while fan 361 operates for repressuring the bag filters separating carbon black from reactor 363. This interlock circuit also opens the switch in circuit 307 for opening a circuit 328 to bag filter cycle-timers operating in conjunction with the bag filter separating carbon black from reactor 200. Also this interlock operates to open a circuit 308 for closing down bag filter cycle-timers operating in conjunction with bag filters separating carbon black from the effluent from reactors 363 by way of circuit 329.

With the process air blower 216 closed down, pressure in process air conduit 219 drops and this drop in pressure operates by way of conduit 240 to operate pressure-switches 355, 356, alarm 359, and hand-switches 357 and 358 in the same manner as explained relative to the corresponding parts of FIGURE 1.

The drop in shutdown instrument air pressure in conduit 227 downstream of valve 272 decreases pressure in a branch conduit 248 which opens a three-way valve 259 to bleed thereby closing a normally closed diaphragm valve 282 in conduit 219. A pressure recorder controller 352 records pressure in conduit 219, controls pressure in conduit 219 by way of a three-way valve 258, conduit 241 and normally open pneumatic valve 283. For plant shutdown purposes a drop in shutdown air pressure in conduit 248 opens valve 258 to bleed pressure from conduit 241 thereby opening valve 283 to vent conduit 219.

A drop in the shutdown air pressure reduces air pressure in conduit 228 thereby reducing pressure in conduit 229 and by way of a pressure-switch 332 and hand-switch 330 closing down the HAF–ISAF bag filter repressuring fan and cycle-timers, that is bag filter cycle-timers, to which circuit 328 leads. The reduced pressure in conduit 229 also opens a three-way valve 256 to bleed pressure from a diaphragm valve 273 thereby allowing normally open valve 273 to open and vent any gas passing through the blower 360 to the atmosphere by way of conduit 320. Air pressure is also reduced in a branch conduit 230 thereby actuating valve 252 to bleed pressure from the diaphragms of valves 276 and 277 thereby allowing normally closed valve 277 to close and normally open valve 276 to open thereby recycling conversion oil.

Shutdown air pressure also decreases in branch conduit 231 which pressure decrease actuates a three-way valve 253 to bleed instrument air from the diaphragm of valve 278 in conduit 234 to allow the normally closed valve 278 to close thereby closing off tangential gas to reactor 200. In normal operation, a flow rate recorder-controller 342 regulates the rate of flow and records same in conduit 215 by manipulation of valve 278.

Shutdown air pressure also decreases in branch conduit 232 thereby actuating three-way pneumatic valves 254 and 255 to bleed air pressure from the diaphragms of diaphragm valves 279 and 280 by way of conduits 235 and 236 respectively, thereby allowing the normally closed valves 279 and 280 to close. In starting up reactor 200, valve 280 regulates a small flow of air and when in normal operation valve 280 is closed and valve 279 regulates a larger rate of flow of air. A flow recorder-controller 343 records the rates of flow of process air through branch conduit 221 or through 220a, whichever is being used. This reduction in the shutdown air pressure is also communicated to the diaphragm of a valve 325 in steam conduit 226 thereby allowing flow of purge stream from conduit 225 to flow through conduit 226 for purging out combustible gases from header 212.

With respect to the operation of the FEF–GPF reactor 363, the decrease in shutdown air pressure is communicated from conduit 227 to conduit 250 and thence through a conduit 249 to actuate a three-way valve 257 to bleed air pressure from the diaphragm of valve 274 thereby allowing the normally open valve 274 to open thereby allowing gases from the blower 361 to pass through a conduit 322 to vent. Conduits 238 and 239 conduct instrument air from sources, not shown, to the respective diaphragm valves 273 and 274.

The drop in shutdown air pressure in conduit 249 actuates a pressure-switch 333 which opens a circuit through hand-switch 331 thereby opening power circuit 308 to shut down the blower 361 and to shut down the bag filter cycle-timers actuated through circuit 329 which operate the bag filters separating carbon black produced in reactors 363.

The reduction in shutdown air pressure in conduit 250 also actuates a three-way valve 260 thereby shutting off instrument air pressure from conduit 244 and opening the diaphragms of valves 287 and 288 to bleed. This operation allows normally closed valve 288 to close and normally open valve 287 to open thereby by-passing the conversion oil to recycle.

The drop in air pressure in branch conduit 250 is also communicated with the diaphragm of the three-way valve 261 under which condition valve 261 is actuated thereby closing off instrument air pressure from conduit 243 and bleeding pressure from the diaphragms of diaphragm valves 285 and 286. Since valves 285 and 286 are normally closed valves, this operation closes these valves thereby closing or maintaining the valves 285 and 286 closed.

However, in normal operation a manually operable valve 284 is closed to close off flow of warm-up gas through conduit 296 since the atomizing air in conduit 362 is intended for use only with the charge oil introduced into reactor 363 by way of a conduit 299.

The reduction of shutdown air pressure in conduit 251 actuates three-way valves 262 and 263 thereby bleeding instrument air pressure from the diaphragms of valves 289 and 290 by way of conduits 246 and 245, respectively, thereby allowing these normally closed valves to close. Flow recorder controllers 346 and 347 in normal operation of the system record the flows of process air through conduits 302 and 303 respectively by control or regulation of the flow control valves 289 and 290.

The drop in shutdown air pressure also actuates diaphragm valve 326 thereby opening conduit 324 to admit steam from conduit 225 to the header 301a. If pressure of the conversion oil drops below a predetermined value, pressure-switch 337 opens circuit 311, and if the tangential fuel pressure in conduit 214 drops below a predetermined value pressure-switch 334 opens circuit 310. When either of these pressure-switches 334 or 337 open their respective circuits, alarms 335 or 338 either light up or sound a bell to warn the operator of the break in electric power. Alarms 335 and 338 also operate if the source of power to circuits 310 or 311, respectively, is interrupted.

When conversion oil pressure increases to an abnormally high pressure, a pressure indicating controller 339 actuates flow control valve 281 to by-pass a portion of the high pressure oil thereby regulating the conversion oil pressure to the several reactors. Also, valve 281 and controller 339 operate to maintain a predetermined pressure in oil conduit 201.

Likewise a pressure indicating controller 336 actuates a flow control valve 275 in the tangential fuel conduit 214 to maintain the pressure at a predetermined value so as not to inadvertently increase the pressure in the burners of the reactors.

Circuits 310 and 311 connect with circuit 317 which connects with the solenoid of a solenoid valve 270a for closing off or for admitting steam to boiler pumps through conduit 323 in case steam to these pumps is desired to be so controlled.

Circuit 311 communicates with circuit 314 by way of hand-switch 341 to the solenoid valve 266. Hand-switch 341 is provided in case it is ever desired to close down reactor 200 without closing down reactor 363. When it is desired to close down reactor 200, upon actuating hand-switch 341 the valve 266 closes off instrument air pressure from conduit 233 and opens to bleed pressure from the diaphragms of valves 276 and 277 thereby closing valve 277 and opening 276 to conversion oil recycle. This circuit 311 also connects with circuit 315 which, when the solenoid of a three-way solenoid valve 264 is de-energized, bleeds instrument air from the downstream side of valve 264 and thereby speeding actuation of the shutdown instruments downstream of this valve. Similarly, a solenoid valve 265 is actuated through circuit 318 or by opening hand-switch 340. Thus, by opening hand-switch 340, the reactors 200 can be shut down without shutdown of reactors 363. However, upon failure of electric power in circuit 315, valve 264 will shut down the reactors 363 without shutting down reactor 200. Pressure-switches 291 and 292 are provided in circuit 315 and operate in response to pressure of the conversion oil in conduit 298 in such a manner that pressure-switch 292 actuates an alarm 294 when pressure of the conversion oil drops to a value below a predetermined pressure, such as 75 pounds per square inch gage, and pressure-switch 291 actuates alarm 293 when pressure of the conversion oil in conduit 298 reaches a value greater than a predetermined value such as 125 pounds per square inch gage. Furthermore, a hand-switch 348 is provided for actuation of a solenoid valve 271 for venting air pressure from the diaphragms of diaphragm valves 262 and 263 for control of valves 289 and 290.

Also, a branch circuit 316 connects with branch circuit 315 and leads by way of a hand-switch 349 to three-way solenoid valve 268 for closing valves 285 and 286; also, another branch circuit leads through a hand-switch 350 for actuating three-way solenoid valve 269 for bleeding air pressure from the diaphragms of valves 287 and 288 for closing valve 288 and opening valve 287.

Process air from conduit 220, as mentioned before, either passes on through this conduit and valve 279 or through by-pass conduit 221 and thence on to a conduit 222 for passage of at least a portion of the air through preheater 211 and thence through a conduit 224 to the tangential burners of reactor 200. A portion of the air by-passes conduit 222 and flows through conduit 223 for use as axial air in reactor 200.

In case it is ever desired to admit steam into header 212 or header 301a without shutting down the balance of the system, a hand-switch 344 in circuit 312 is provided for actuating a three-way solenoid valve 267 which bleeds air pressure from diaphragm valve 325 thereby opening conduit 226 to the flow of steam. Likewise a hand-switch 345 is provided in circuit 313 for actuating three-way solenoid valve 270 for bleeding air pressure from the diaphragm of diaphragm 326 to admit steam through conduit 324 to header 301a.

A flow recorder 351 is provided in conjunction with conduit 296 for recording the flow of tangential gas used in warming up reactors 363.

Conduit 319 and conduit 321 conduct off-gas from the respective bag filter systems to blowers 360 and 361 respectively.

Conduits 297 and 298 pass conversion oil to and from heat exchanger 301 for passage to conduit 299 into reactor 363 or for recycle in conduit 300.

Thus, by the operation of the shutdown apparatus illustrated in FIGURE 2 and described relative thereto by actuation of three-way solenoid valve 272, the entire system is shut down; or, by actuation of solenoid valve 264, the system of reactors 363 is shut down; or, by actuation of solenoid valve 265, the system of reactor 200 is closed down.

Thus, all reactors of both systems, as illustrated in FIGURES 1 and 2, are entirely closed down upon electric power failure to the plant. Upon tangential gas or oil failure the HAF–ISAF reactors of both figures close down. Upon failure of conversion oil in the system of FIGURE 1 both FEF–GPF and HAF–ISAF reactor operations shut down completely. Upon failure of conversion oil in the system of FIGURE 2, the feed oil to the FEF–GPF reactors goes on recycle and the line of reactors shuts down. The HAF–ISAF reactors go on feed oil recycle and continue running on inert gas operation, that is, an excess air is used so as not to produce combustible constituents in the off gases. Since the furnace effluent gases from the carbon black producing reactors contain hydrogen and carbon monoxide in appreciable proportions, any air drawn or injected into any of these gases from the reactors presents a particularly explosive hazard. Since the gases pass from the reactors through the headers to the bag-filter systems, the bag filter systems, the headers and connecting conduits are particularly subject to possible explosions.

That which is claimed is:

1. In a system for production of carbon black by the incomplete combustion of a hydrocarbon charge stock including a reactor, an electric motor driven process air blower, first conduits supplying a hydrocarbon charge stock to said reactor and passing process air under pressure from said blower to said reactor, a second conduit for conveying reaction products from said reactor to bag filter carbon black recovery equipment, a third conduit communicating said bag filter recovery equipment with a source of noncombustion supporting gas, an electric motor driven bag filter repressuring blower in said third conduit, first and second electrical circuits supplying electrical power to the motors of said process air blower and said repressuring blower, respectively, an emergency shutdown system comprising, first and second switches in said first and second circuits, respectively, an electrical interlock communicating said first circuit with said second switch, a fourth conduit leading from a source of instrument air, a 3-way electric motor operative valve in said fourth conduit, a third electrical circuit supplying electric power to the motor of said valve, a third switch in said third circuit, a first pressure sensing means in communication with the first conduit passing process air to said reactor and with said third switch, a second pressure sensing means communicating with said fourth conduit and with said first switch whereby upon sensing a pressure less than a predetermined pressure in said first conduit passing process air to said reactor said first pressure sensing means closes said third switch in said third circuit thereby energizing the motor of said motor valve thereby closing same to said source of instrument air and reducing instrument air pressure in said fourth conduit on the side of said valve remote from said source of instrument air, said second pressure sensing means thereby sensing the decreased pressure in said fourth conduit and opening said first switch thereby shutting down the electric motor driven process air blower and via said interlock opening said second switch thereby shutting down the electric motor driven repressuring blower.

2. In a system for production of carbon black by the incomplete combustion of a hydrocarbon charge stock including a reactor, a first conduit for supplying a hydrocarbon charge stock from a source thereof to said reactor, a second conduit supplying fuel under pressure from a source thereof to said reactor, a first electric motor driven process air blower, a third conduit communicating said air blower with said reactor, a first vent conduit provided with a first valve and communicating with said third conduit, a second valve in said third conduit intermediate said vent conduit and said blower, a third valve in said second conduit, a fourth conduit communicating said first conduit at a first point with said source of charge stock, a carbon black recovery system, a fifth conduit communicating said reactor with said recovery system, a sixth conduit communicating with said fifth conduit for passage of steam, a seventh conduit leading from a source of noncombustion supporting gas to said recovery system, a second electric motor driven blower in said seventh conduit, a second vent conduit communicating with said seventh conduit intermediate said second blower and said recovery means, fourth, fifth, sixth, and seventh valves in, respectively, said sixth conduit, second vent conduit, fourth conduit, and first conduit downstream of said first point, an emergency shutdown system operable in the event of an electric power failure and in the event of a process air supply failure, comprising first and second electrical circuits communicating the motors of said first and second blowers with a source of electrical power, a first switch in said second circuit, an electrical interlock operably connecting said first circuit with said first switch, an eighth conduit leading from a source of instrument air, an electric motor operated 3-way valve in said eighth conduit, a third electrical circuit communicating the motor of said motor valve with a source of electrical power, a first pressure switch operably communicating said third conduit downstream from said second valve with said third circuit, a second pressure switch operatively communicating said eighth conduit downstream from said motor valve, with said first circuit, first, second, third, fourth, fifth, sixth and seventh pressure sensing control means operatively communicating said eighth conduit, respectively, with said second, first, third, sixth, seventh, fourth and fifth valves whereby upon electric power failure, and upon failure of said process air blower, the motor of said 3-way valve becomes de-energized and the valve closes off said source of instrument air and opens a bleed from the downstream portion of said eighth conduit and pressure therein decreases to a value below a predetermined value whereby said second pressure switch opens said first circuit thereby closing down said air blower and via said interlock closing down said second blower, and said first pressure sensing control means closing said second valve, said first pressure switch opening said third circuit whereby said 3-way valve closes off said instrument air supply and vents pressure downstream of said 3-way valve, and said second, fourth, fifth, third, sixth and seventh pressure sensing control means, respectively, opening said first valve, opens said sixth valve and closes said seventh valve, closing said third valve, opening said fourth valve and opening said fifth valve thereby closing down said air and said noncombustion supporting gas blowers; opening the valves in said vent conduits, closing off air flow, fuel flow and hydrocarbon charge stock flow to said reactor and admitting purge steam to said fifth conduit.

3. In a system for production of carbon black by the incomplete combustion of a hydrocarbon charge stock including a reactor, a first conduit for supplying a hydrocarbon charge stock from a source thereof to said reactor, a second conduit communicating with said first conduit at a first point for supplying atomizing air, a first electric motor driven process air blower, a third conduit communicating said air blower with said reactor, a first vent conduit provided with a first valve communicating with said third conduit, a second valve in said third conduit intermediate said vent conduit and said blower, a third valve in said second conduit, a fourth conduit communicating said first conduit at a second point upstream of said first point with said source of charge stock, a carbon black recovery system, a fifth conduit communicating said reactor with said recovery system, a sixth conduit communicating with said fifth conduit for passage of steam, a seventh conduit leading from a source of noncombustion supporting gase to said recovery system, a second electric motor driven blower in said seventh conduit, a second vent conduit communicating with said seventh conduit intermediate said second blower and said recovery means, fourth, fifth, sixth and seventh valves in, respectively, said sixth conduit, second vent conduit, fourth conduit and first conduit downstream of said first point, an emergency shutdown system operable in the event of an electric power failure and in the event of a process air supply failure, comprising first and second electrical circuits communicating the motors of said first and second blowers with a source of electrical power, a first switch in said second circuit, an electrical interlock operably connecting said first circuit with said first switch, an eighth conduit leading from a source of instrument air, an electric motor operated 3-way valve in said eighth conduit, a third electrical circuit communicating the motor of said motor valve with a source of electrical power, a first pressure switch operably communicating said third conduit downstream from said second valve with said third circuit, a second pressure switch operably communicating said eighth conduit downstream from said motor valve with said first circuit, first, second, third, fourth, fifth, sixth and seventh pressure sensing control means operatively communicating said eighth conduit, respectively, with said second, first, third, sixth, seventh, fourth and fifth valves, whereby upon electric power failure, and upon failure of said process air blower the motor of said 3-way valve becomes de-energized and the valve closes off said source of instrument air and opens a bleed from the downstream portion and pressure therein decreases to a value below a predetermined value whereby said second pressure switch opens said first circuit thereby closing down said air blower and via said interlock closing down said second blower, and said first pressure sensing control means closes said second valve, said first pressure switch opening said third circuit whereby said 3-way valve closes off said instrument air supply and vents pressure downstream of said 3-way valve and said second, fourth, fifth, third, sixth and seventh pressure sensing control means, respectively, opening said first valve, opening said sixth valve and closing said seventh valve, closing said third valve, opening said fourth valve and opening said fifth valve thereby closing down said air and noncombustible supporting gas blowers; opening the valves in said vent conduits, closing off process air flow, atomizing air flow and hydrocarbon charge stock flow to said reactor and admitting purge steam to said fifth conduit.

References Cited in the file of this patent
UNITED STATES PATENTS

| | | |
|---|---|---|
| 2,785,960 | Ribble et al. | Mar. 19, 1957 |
| 2,883,271 | Pennington et al. | Apr. 21, 1959 |
| 2,886,567 | Wood | May 12, 1959 |
| 3,038,788 | Pennington et al. | June 12, 1962 |